C. A. A. RAND.
TONGUE TRUCK.
APPLICATION FILED FEB. 9, 1917.
1,367,518. Patented Feb. 1, 1921.
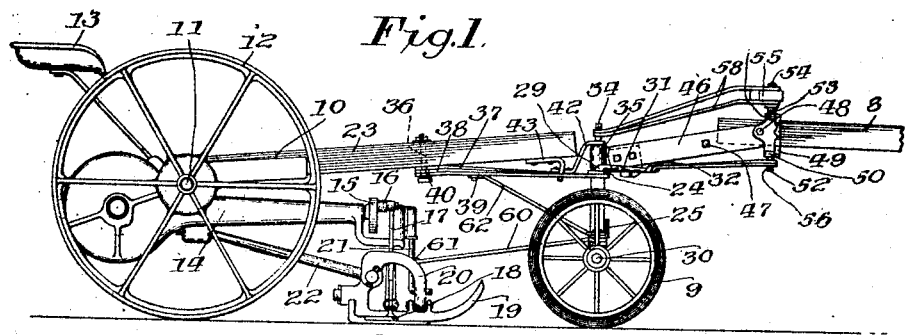
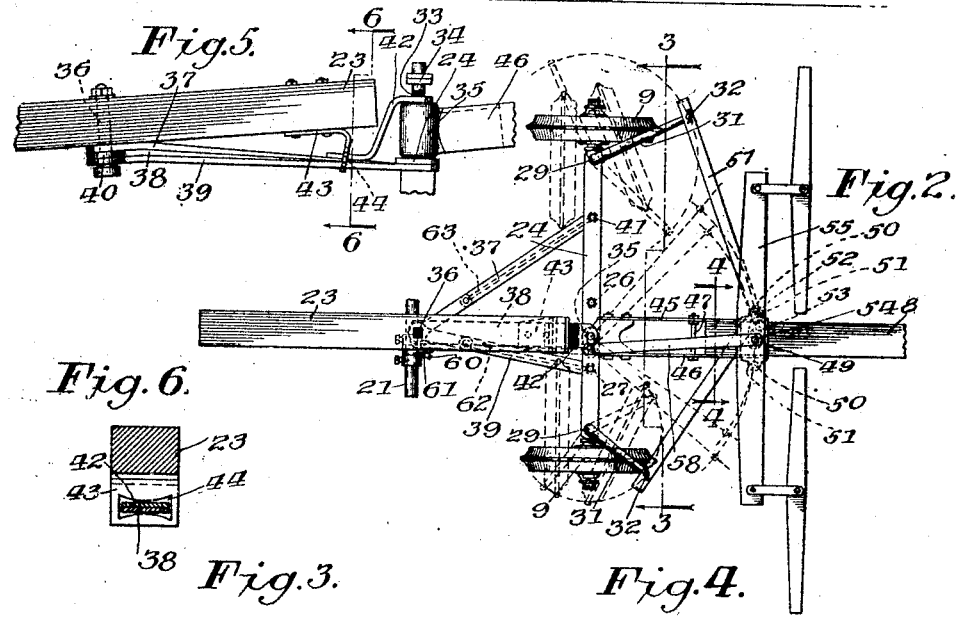
Inventor
Charles A. A. Rand,
by Chas. E. Lord
Atty.

UNITED STATES PATENT OFFICE.

CHARLES A. A. RAND, OF CHICAGO, ILLINOIS, ASSIGNOR, BY MESNE ASSIGNMENTS, TO INTERNATIONAL HARVESTER COMPANY, A CORPORATION OF NEW JERSEY.

TONGUE-TRUCK.

1,367,518. Specification of Letters Patent. Patented Feb. 1, 1921.

Application filed February 9, 1917. Serial No. 147,565.

*To all whom it may concern:*

Be it known that I, CHARLES A. A. RAND, a citizen of the United States, residing at Chicago, in the county of Cook and State of Illinois, have invented certain new and useful Improvements in Tongue-Trucks, of which the following is a full, clear, and exact specification.

My invention relates to tongue trucks, and more especially to those used in connection with mowers, harvesters, tillage implements, or the like, having a stub tongue as a part of their equipment.

The invention has among its objects to provide means for preventing side draft of the harvester, or like machine, and to provide means for flexibly connecting the propelling mechanism with the harvester in such a manner as to permit the latter to rise and fall, and also to insure a quick and accurate response as the device is turned or deviated from the straight path of travel.

A further object is to provide means for eliminating any tendency of the draft power to cause the operative parts of the trailing device, as, for instance, the cutting apparatus of a mower, to rise from the ground during the operation of the machine.

I attain these objects by means of a tongue truck flexibly connected to the trailing device and provided with supplemental link connections between the draft device and the operative parts of the trailing device.

In the drawings I have illustrated my tongue truck as operatively connected to a mower of standard type and have illustrated one embodiment of my invention.

In these drawings—

Figure 1 is a side elevation of a mower with my improved truck attached thereto;

Fig. 2 is a plan view of the tongue truck, the stub tongue of the mower being shown;

Fig. 3 is a section on line 3—3 of Fig. 2 tooking in the direction of the arrows;

Fig. 4 is a section on line 4—4 of Fig. 2 looking in the direction of the arrows;

Fig. 5 is an enlarged detail elevation showing the connections between the stub tongue of the mower and the tongue truck; and Fig. 6 is a detail sectional view taken on line 6—6 of Fig. 5.

The same reference characters are employed throughout the several views to indicate like parts.

The mower shown is of standard construction and comprises a frame 10 mounted on an axle 11 supported by wheels 12 and carrying a seat 13. The mower is provided with the usual casing 14 through which extends the drive shaft of the cutting apparatus, which is connected at its front end to a crank disk 15 carrying a crank 16 connected by means of a pitman 17 to the cutter bar 18. The cutter bar 18 is carried by the usual shoe 19 pivoted on a yoke 20, which is connected to the main frame by a coupling bar 21 and is also pivotally connected to the diagonally disposed push bar 22, the stubbleward end of which is carried by the frame. The mower frame also carries a stub tongue 23 which is flexibly connected at its front end to the tongue truck in a manner to be hereinafter described.

The tongue truck frame is made up of two spaced-apart members 24 and 25 which are rigidly connected to each other by means of vertically disposed posts 26 and 27 and a diagonally disposed brace rod 28. The members 24 and 25 are provided at their ends with registering apertures, through whi h extend the vertical supporting shafts 29 having integral therewith at their lower ends laterally turned arms 30 carrying tongue truck wheels 9 and provided at their upper ends with forwardly diverging crank arms 31 terminating at their free ends in vertically disposed portions 32. The frame members 24 and 25 carry intermediate their ends a vertically disposed shaft 33 having an integral crank arm 34 at its upper end vertically spaced from the frame member 24. Intermediate the crank arm 34 and the upper frame member 24, there is mounted on the shaft 33 a bracket member 35. The stub tongue 23, intermediate its ends, is provided with a shouldered clamping bolt 36, by means of whi h resilient spring metal bars or links 37, 38 and 39 are secured to said stub tongue in a manner clearly shown in the enlarged detail in Fig. 5. From a reference to said figure, it will be seen that the shouldered portion of the bolt 36 bears against the inner bar 37, securing the same rigidly to the stub tongue, and that the enlarged portion 40 of the bolt 36 carries the links or bars 38 and 39, sufficient space being left between the head of bolt 36 and the shouldered portion thereof to allow a free rocking movement of bars 38 and 39 thereon. The bar 37 is secured at its forward end by means of a bolt 41 to the upper frame member 24 of the truck, and the bar 39 is likewise secured to the same member by the vertical post 27, a shouldered portion of said post bearing against said bar and securing the same to the member 24. Instead of being secured by a shoulder on the post 27, the bar 39 may be clamped between a short pipe or tubular member carried by the post, and member 24. The front end of the bar 38 is carried by the shaft 33 below the member 24. An angular bracket 42 is secured to the bar 38 intermediate its ends and the upper end of the bracket is carried by the shaft 33 between the bracket 35 and the crank 34. The angular bracket 42 bears against the bracket 35 and supports the bar 38 against vertical movement on shaft 33. An angular slotted guide or bracket 43 is secured to the under side of the stub tongue 23 near the front end thereof, and the downwardly extending portion thereof is provided with a slot 44 having arcuate upper and lower walls through which extend the angular bracket 42 and bar 38. From the foregoing description it will be seen that a relative torsional or twisting movement between the tongue truck and the mower is permitted, the bar 38 and bracket 42 rocking in slot 44 which is formed by two oppositely disposed convex edges, as shown in Fig. 6.

The bracket member 35 carries at its front end two spaced-apart bars 45 and 46 which are rigidly connected by means of a transverse spacing bolt 47. These bars or straps 45 and 46 form the tongue for the tongue truck and are connected at their forward ends by means of a bolt 48 to a box-shaped member 49, through which projects the rear end of draft tongue 8, the latter being secured to the bars 45 and 46 and box 49 by the bolt 48. The box-shaped member 49 is provided with laterally extending ears 50, which are spaced apart vertically and are provided with registering apertures 51. A vertically disposed rocking shaft 52 is carried by one set of these apertures and this shaft has a laterally extending crank arm 53 at its upper end, to the end of which is connected, by means of a bolt 54, a draft evener 55. Secured to the lower end of the rocking shaft 52 means of a cotter pin 56, are two diverging links 57 which are pivotally connected at their opposite ends to the vertically disposed portions 32 of the shafts 29. The crank arm 34 at the upper end of the vertical shaft 33 carries links 58 pivotally connected at their opposite ends by means of the bolt 54, to the draft evener 55, one of these links being secured above said draft evener and the other being secured below the same between the crank arm 53 and said evener. At the lower end of the shaft 33 is a crank arm 59, to which is secured the front end of a link 60, the rear end of said link being connected by means of an eye 61 to the coupling bar 21. In order to strengthen the connection between the stub tongue 23 and the tongue truck, I have secured to the under side of the bars 39 and 37 additional brace rods 62 and 63. The brace 62 is secured at its forward end to the angular tongue truck frame member 25 by means of a shoulder on the vertical post 27 or by a pipe section carried by said post. The brace rod 63 is bolted to the member 25 as shown in Fig. 3.

The operation of the tongue truck, as the device is guided over the field, is well known and will not be here described in detail. In Fig. 2 I have shown three positions of adjustment, one position being shown in full lines, namely, that taken when the device is drawn straight ahead, the other two positions being shown in dotted lines. The construction of the shaft 29, with its end portions 30 and 31, is old and common, and the operation thereof is well understood by those familiar with the art and therefore the same will not be further described. As the machine is drawn forward and a substantially horizontal pull is exerted upon the draft evener 55, this pull is transmitted through the tongue 45 of the tongue truck, vertical shaft 33, and link 60, to the cutting apparatus. By this means a forward pull is exerted upon the cutting apparatus and the tendency to lift the same is eliminated. By means of the flexible connection through the resilient links 37, 38 and 39, the guide 43 and the bracket 42, I have overcome a prominent defect in prior devices and have provided a structure permitting, within certain limits, independent rocking movement between the tongue truck and the trailing device, or, as is shown here, the mower, thereby eliminating the tendency of the truck to split the mower tongue when a torsional strain is placed upon the tongue by the rocking of the truck. From an inspection of the construction shown in detail in Fig. 5, it will be clear that the slot 44 permits a slight vertical movement and a rocking movement by the members 42 and 38, which extend therethrough, independent of the movement of the front end of the stub tongue 23, thus increasing the flexibility of the device and providing for greater vertical play than is obtained by means merely of the flexible resilient straps above described.

While I have illustrated in the accompanying drawings and have above described in the specification but one embodiment of my invention, it will be understood that the same may be modified without departing from the spirit of the invention, and that the form used is merely for the purpose of illustration.

What I claim as new and desire to secure by Letters Patent is:

1. In combination, an agricultural implement, a stub tongue carried thereby, a tongue truck, and resilient means secured to said tongue truck at a plurality of points on opposite sides of the stub tongue and secured to said stub tongue for connecting the tongue truck and said stub tongue.

2. In combination, an agricultural implement, a stub tongue carried thereby, a tongue truck, and means including resilient straps secured to said stub tongue and diverging therefrom and secured to said tongue truck on opposite sides of the line of draft for connecting said stub tongue and tongue truck.

3. In combination, an agricultural implement, having a stub tongue, a tongue truck, a plurality of resilient bars connected to said tongue intermediate its ends and to said truck, and means carried by the end of said tongue for guiding certain of said bars and for permitting relative movement between the end of said tongue and said bars.

4. In combination, an agricultural implement, having a stub tongue, a tongue truck, a plurality of resilient bars connected to said tongue intermediate its ends and to said truck, and slotted means carried by the free end of said tongue for guiding certain of said bars and for permitting relative movement between the end of said tongue and said bars.

5. In combination, an agricultural implement having a stub tongue and operative elements, a tongue truck resiliently connected to said stub tongue, an evener on said truck, and means connected between said evener and said operative elements for maintaining the draft in a plane substantially parallel to the ground.

6. In combination, an agricultural implement, a stub tongue carried thereby, a supplemental tongue, and resilient draft means connecting said supplemental tongue to said stub tongue.

7. In combination, an agricultural implement, a stub tongue carried thereby, a supplemental tongue and torsional spring connections between said supplemental tongue and said stub tongue, said spring connections being secured to said stub tongue intermediate the ends of said stub tongue.

8. In combination, an agricultural implement, a stub tongue carried thereby, a supplemental tongue, torsional spring connections between said supplemental tongue and said stub tongue, and means engaging said spring connections for limiting the torsional movement of one of said tongues with respect to the other.

9. In combination, an agricultural implement, a stub tongue carried thereby, a tongue truck, a plurality of resilient means connected to said stub tongue at a common point and to said tongue truck and so disposed as to permit independent rocking movement of said agricultural implement on an axis substantially parallel to the line of draft.

10. In combination, an agricultural implement, a stub tongue carried thereby, a tongue truck, means including resilient straps for connecting said stub tongue and said tongue truck, and means carried by said tongue loosely receiving said straps and guiding said straps in their movement.

11. In combination, an agricultural implement, a tongue truck therefor, and resilient draft members connected between said truck and said implement permitting movement of said truck and said implement on an axis parallel to the line of draft.

12. In combination, an agricultural implement, a tongue truck therefor having a transverse frame member, and resilient draft connections between said transverse frame member and said implement permitting independent movement of said truck and said implement on an axis parallel to the line of draft.

13. In combination, an agricultural implement, a tongue truck therefor, a connection between said tongue truck and said implement, permitting movement of said truck and said implement upon an axis parallel to the line of draft, and means comprising a plurality of bars extending from said implement through a member having a convex edge for limiting said movement.

14. In combination, an agricultural implement, a stub tongue carried thereby, a tongue truck connection between said stub tongue and said tongue truck, permitting movement of said stub tongue and said tongue truck upon an axis parallel to line of draft and means comprising a plurality of bars extending from said tongue truck in passing through a member fixed to the forward end of said stub tongue for limiting said movement.

15. In combination, an agricultural implement, a stub tongue carried thereby, a tongue truck having a frame and wheels swiveled thereto, a tongue pivoted to said frame, and resilient means connecting the pivot of said tongue to said stub tongue.

16. In combination, an agricultural implement, a stub tongue carried thereby, a tongue truck having a frame and wheels swiveled thereto, a tongue pivoted to said tongue truck on a substantially fixed vertical pivot, and resilient means connecting the pivot of said tongue to said stub tongue.

17. In combination, an agricultural implement, a forwardly projecting draft element carried thereby, a tongue and means for supporting said tongue, and resilient draft means connecting said tongue to said draft element.

18. In combination, an agricultural implement, a forwardly projecting draft element carried thereby, a tongue, and substantially straight torsional spring draft connections between said tongue and said draft element.

19. In combination, an agricultural implement, a forwardly projecting draft element carried thereby, a tongue, and torsional spring draft connections between said tongue and said draft element, and means for limiting the torsional movement of said tongue with respect to said draft element.

In testimony whereof I affix my signature.

CHARLES A. A. RAND.